(12) United States Patent
Verhoff

(10) Patent No.: US 10,775,076 B2
(45) Date of Patent: Sep. 15, 2020

(54) WATER CONTAINER FLUSHING SYSTEM INCLUDING SEDIMENT SEPARATOR, SEDIMENT BUSTER AND ASSOCIATED METHODS

(71) Applicant: John Verhoff, Cape Coral, FL (US)

(72) Inventor: John Verhoff, Cape Coral, FL (US)

(73) Assignee: Nerd Concepts, Inc., Bonita Springs, FL (US)

( * ) Notice: Subject to any disclaimer, the term of this patent is extended or adjusted under 35 U.S.C. 154(b) by 223 days.

(21) Appl. No.: 15/924,230

(22) Filed: Mar. 18, 2018

(65) Prior Publication Data

US 2019/0285311 A1 Sep. 19, 2019

(51) Int. Cl.
*F24H 9/00* (2006.01)

(52) U.S. Cl.
CPC .................................. *F24H 9/0042* (2013.01)

(58) Field of Classification Search
CPC ........................................................ F24H 9/00
See application file for complete search history.

(56) References Cited

U.S. PATENT DOCUMENTS

| | | | | | |
|---|---|---|---|---|---|
| 3,536,081 A | * | 10/1970 | Riess | .................... | B08B 9/0323 134/22.12 |
| 4,271,015 A | * | 6/1981 | Moore | ................. | B01D 35/143 210/282 |
| 4,790,289 A | * | 12/1988 | Barrett | ...................... | F24H 1/18 122/17.1 |
| 5,417,851 A | * | 5/1995 | Yee | ........................ | B01D 29/96 210/167.01 |
| 5,494,527 A | * | 2/1996 | Ludwig | ................. | F24H 9/0042 134/3 |
| 6,318,403 B1 | * | 11/2001 | Fritz | ....................... | F16K 15/03 122/504 |
| 6,572,765 B2 | * | 6/2003 | Lincke | .................... | C02F 1/004 210/167.12 |
| 7,097,765 B1 | * | 8/2006 | Jackiw | .................... | C02F 1/283 210/266 |
| 2004/0139930 A1 | * | 7/2004 | Frasure | ................. | F24H 9/0042 122/367.4 |

(Continued)

*Primary Examiner* — Nathaniel Herzfeld
(74) *Attorney, Agent, or Firm* — CollaborativeIP; Paul J Ditmyer

(57) ABSTRACT

A water heater flushing system includes a housing having an inlet configured to be coupled to a drain port of the water heater and receive water therefrom, and an outlet configured to discharge water from the housing. A series of filter elements are positioned and spaced apart within the housing transverse to a water flow path defined between the inlet and the outlet, the series of filter elements are configured to separate solid impurities from the water according to different particle sizes (e.g. progressively different or finer particle sizes) in the water flow path between the inlet and the outlet. A viewing feature, such as a transparent lid, is carried by the housing and configured to provide visual access to an interior of the housing for inspection of separated solid impurities at each of the filter elements. A sediment buster may be coupled to the inlet of the housing and configured to send a fluid into the drain port of the water heater. The sediment buster may include a fluid supply device, and shut-off valve between the fluid supply device and the inlet of the housing.

20 Claims, 3 Drawing Sheets

(56) References Cited

U.S. PATENT DOCUMENTS

| | | | | |
|---|---|---|---|---|
| 2004/0261849 | A1* | 12/2004 | Sprague | E03B 7/006 137/239 |
| 2009/0000573 | A1* | 1/2009 | McClellan | F24D 19/0092 122/382 |
| 2011/0308628 | A1* | 12/2011 | Nugent | F24H 9/16 137/13 |

* cited by examiner

WATER CONTAINER FLUSHING SYSTEM INCLUDING SEDIMENT SEPARATOR, SEDIMENT BUSTER AND ASSOCIATED METHODS

FIELD OF THE INVENTION

The present invention relates to the field of water storage, and more particularly, to water heaters and flushing systems and methods.

BACKGROUND OF THE INVENTION

Referring to FIG. 1, typical electric and gas water heaters have a number of components in common, including the tank, the drain valve, the temperature and pressure relief (TPR) valve and associated discharge or overflow tube, an internal anode, dip tube and pipes for cold water inlet and hot water outlet. As supply valve is also typically included for shutting off water to the tank. In both cases, the internal tank is wrapped with insulating material to keep the water hotter longer. Heating elements and thermostats are included, although not shown.

A water heater needs regular maintenance for maintaining performance. A water heater flush is intended to clear out sediment and minerals, such as calcium and lime, that could impede the water heater's performance. Most manufacturers recommend flushing a water heater at least once per year, but this need could also depend on water quality in the region. For example, the harder the water is in the region, the more likely a flush is needed frequently.

Over time, these sediment and mineral deposits collect at the base of a water heater tank. These deposits can build up to a thick, hard coating. This coating diminishes the transfer of heat from the burner to the water in the tank, and eventually also causes corrosion. Additionally, deposits can break free, clogging faucets, pipes, and the valve that is used to flush or empty the water heater tank.

In addition to decreased efficiency, leaving the sediment and minerals to build up in the water heater tank can lead to various other problems including, for example, loss of water pressure, and/or complete failure of the water heater.

Typically, the water heaters are flushed or cleaned utilizing an open flushing approach that includes opening the drain valve for a sufficient period of time until water runs clear. Unfortunately, clogs of sediment can often prevent draining, and the approach is not environmentally friendly as the gallons of sediment filled water are often drained to the yard or into some other container for disposal. Such approaches waste water and may create risks to users, bystanders, and to the environment in which they are used.

U.S. Published Application No. 2012/0118246 to Oberkorn et al. and titled "Sealed and self-contained tankless water heater flushing system" is directed to a sealed and self-contained tankless water heater flushing system including a holding basin, a submersible pump contained within the holding basin, a submersible pump hose, a filter system, a discharge hose for connecting the discharge opening to the water heater, and a filter hose for connecting the filter opening to the water heater.

However, there is a need for a water heater flushing system that is more environmentally friendly by conserving water and not contaminating the environment, that allows for the visual inspection and analysis of the sediment and minerals, and that can more easily break up a clog at the water heater drain.

This background section is intended to introduce the reader to various aspects of typical technology that may be related to various aspects or embodiments of the present invention, which are described and/or claimed below. This discussion is believed to be useful in providing the reader with background information to facilitate a better understanding of the various aspects and embodiments of the present invention. Accordingly, it should be understood that these statements are to be read in light of, and not as admissions of, the prior art.

SUMMARY OF THE INVENTION

It is an object of the present embodiments to provide a water heater flushing system that is more environmentally friendly by conserving water and not contaminating the environment, and that allows for the visual inspection and analysis of the sediment and minerals. It may also be an object of the present embodiments to provide a water heater flushing system that can more easily break up a clog at the water heater drain.

This and other objects, advantages and features in accordance with the present embodiments may be provided by a water heater flushing system that includes a housing having an inlet at a first end and configured to be coupled to a drain port of the water heater and receive water therefrom, and an outlet at a second end and configured to discharge water from the housing. A sediment separator is defined by a series of filter elements that are positioned and spaced apart within the housing transverse to a water flow path defined between the inlet and the outlet, the series of filter elements being configured to separate solid impurities from the water according to different particle sizes (e.g. progressively different or finer particle sizes) in the water flow path between the inlet and the outlet. A viewing feature is carried by the housing and configured to provide visual access to an interior of the housing for inspection of separated solid impurities at each of the filter elements.

Additionally, or alternatively, the viewing feature may be an openable lid connected to the housing. Such lid may be a transparent lid. The transparent lid may include a solid impurities identification feature such as a color or size identification chart.

Additionally, or alternatively, the filter elements may be mesh screens. The mesh screens may be stainless steel mesh screens.

Additionally, or alternatively, a water pump may be coupled to the outlet of the housing. The water pump may include a connection hose configured to be coupled to a temperature and pressure relief (TPR) valve of the water heater to recirculate the water back into the water heater and define a waterless flushing process. The connection hose may include a quick connection fitting configured for connection to the TPR valve.

Additionally, or alternatively, a carbon filter may be positioned in the housing between the series of filter elements and the outlet.

Additionally, or alternatively, a sediment buster may be coupled to the inlet of the housing and configured to send a fluid into the drain port of the water heater. The sediment buster may include a fluid supply device, and shut-off valve between the fluid supply device and the inlet of the housing. The fluid supply device may be a fluid pump or compressed fluid supply.

The solid impurities may be at least one of sediment and scale.

Additionally, or alternatively, the filter elements may be removable.

Additionally, or alternatively, a water diverter may be positioned between the inlet and the series of filter elements, and configured to disrupt a direct flow of water to the series of filter elements.

The housing and lid may be watertight for pressures of at least 200 psi.

Other objects, advantages and features in accordance with the present embodiments may be provided by a water heater flushing system that includes a sediment buster configured to be coupled to a drain port of the water heater and configured to send a fluid into the drain port to break up sediment accumulated at the drain port inside the water heater. The sediment buster may include a conduit having a connector configured to be coupled to the drain port of the water heater, and a fluid supply device coupled to the conduit and configured to selectively supply the fluid to be sent into the drain port via the conduit and connector.

Additionally, or alternatively, a filter housing may include an inlet at a first end and configured to be coupled to the drain port of the water heater via the conduit of the sediment buster and receive water therefrom, and an outlet at a second end and configured to discharge water from the filter housing. A series of filter elements may be positioned and spaced apart within the filter housing transverse to a water flow path defined between the inlet and the outlet, the series of filter elements being configured to separate solid impurities from the water according to different particle sizes (e.g. progressively different or finer particle sizes) in the water flow path between the inlet and the outlet. And, a viewing feature may be carried by the housing and configured to provide visual access to an interior of the filter housing for inspection of separated solid impurities at each of the filter elements.

Additionally, or alternatively, the conduit may further include a shut-off valve between the fluid supply device and the inlet of the filter housing.

Additionally, or alternatively, the fluid supply device may be a fluid pump or compressed fluid supply.

The flushing system could also be used for other equipment, such as tankless water heaters, heat exchangers, boilers, condensers, and other equipment, where scale and sediment build-up is a problem.

DETAILED DESCRIPTION OF THE PREFERRED EMBODIMENTS

The present invention will now be described more fully hereinafter with reference to the accompanying drawings in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. The dimensions of layers and regions may be exaggerated in the figures for greater clarity.

Figure 1:
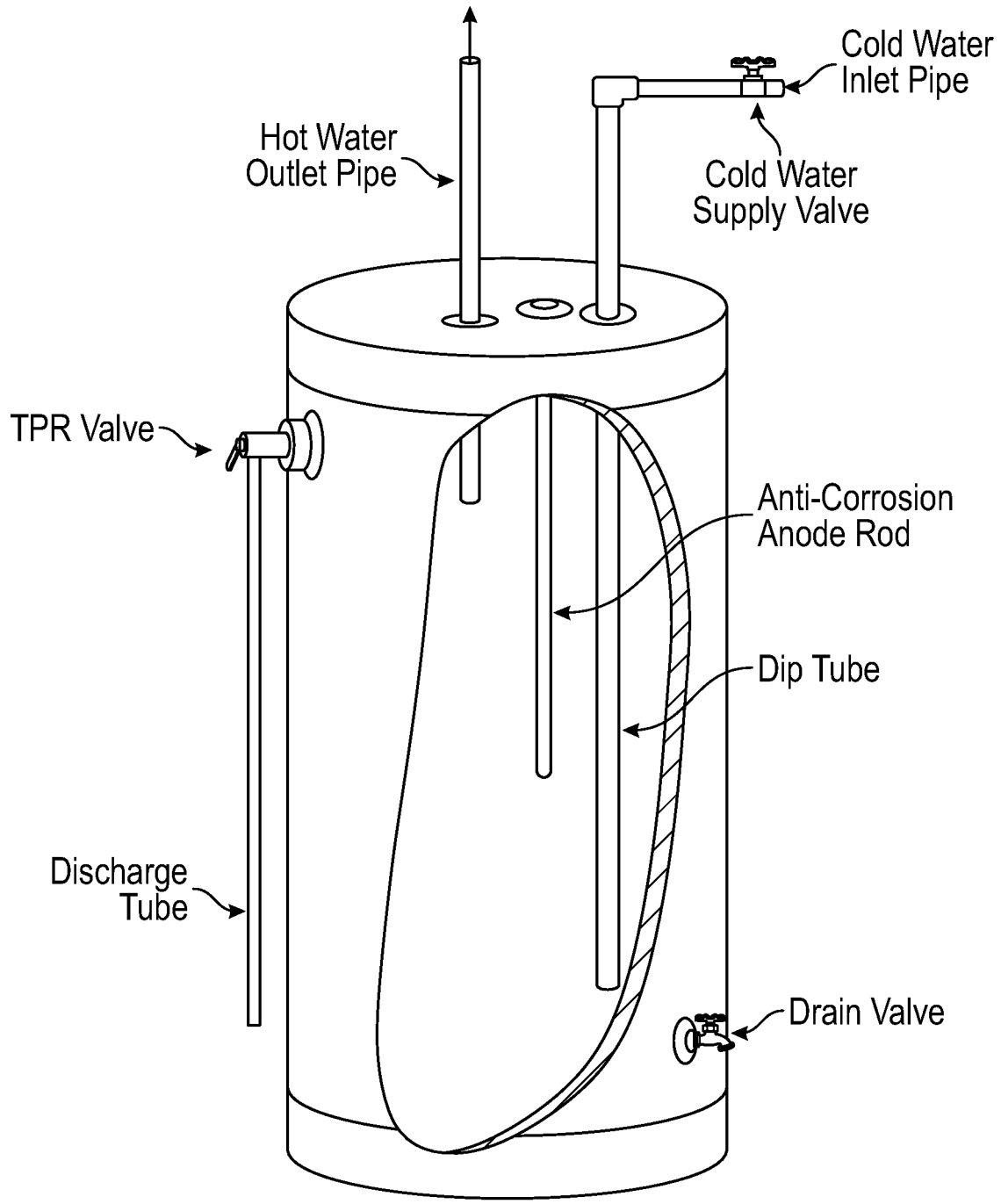
FIG. 1 is a schematic diagram illustrating a typical water heater according to the prior art.
Figure 2:
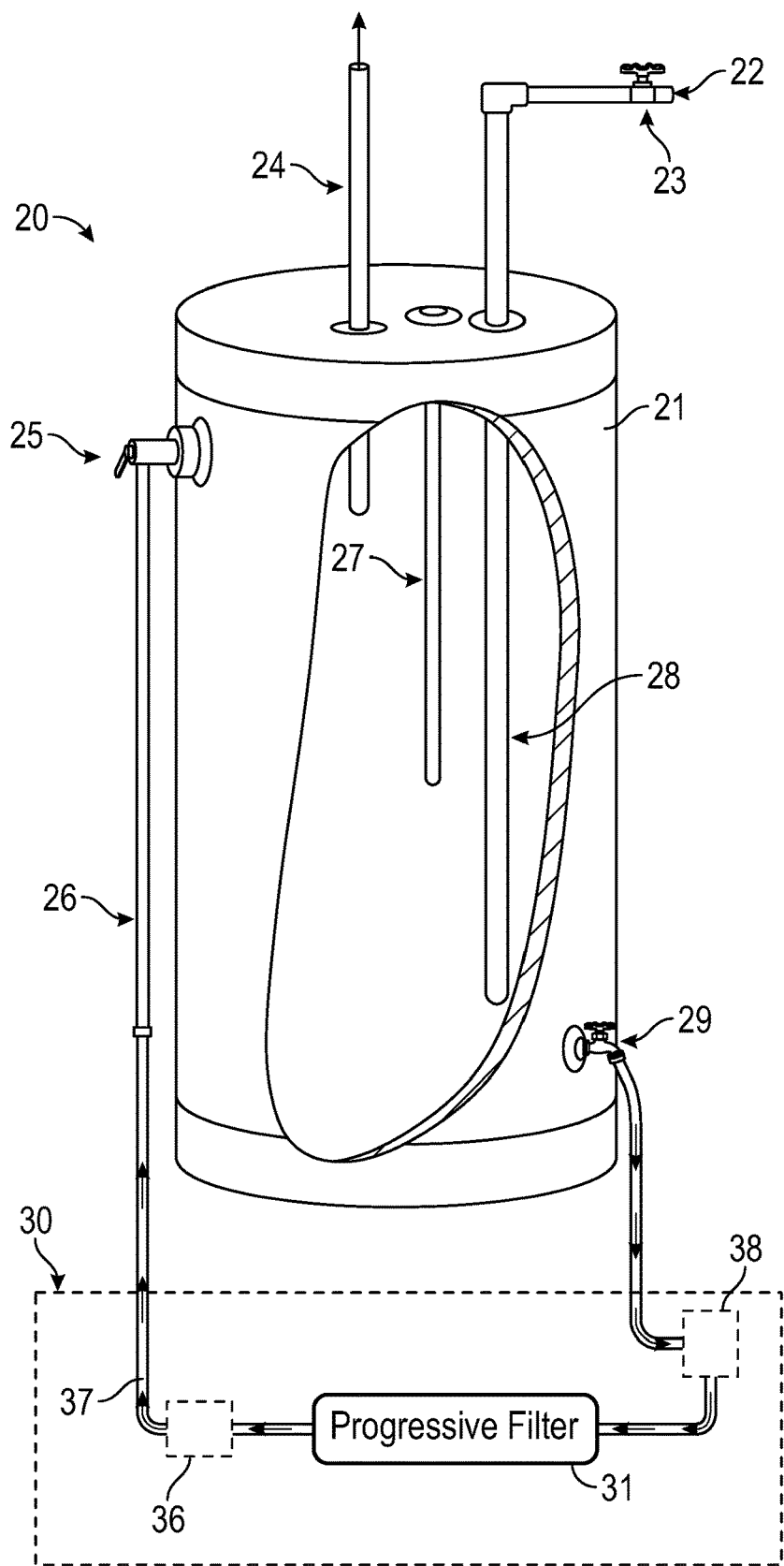
FIG. 2 is a schematic diagram illustrating an embodiment of the water heater flushing system, coupled with a water heater, in accordance with features of the present invention.
Figure 3:
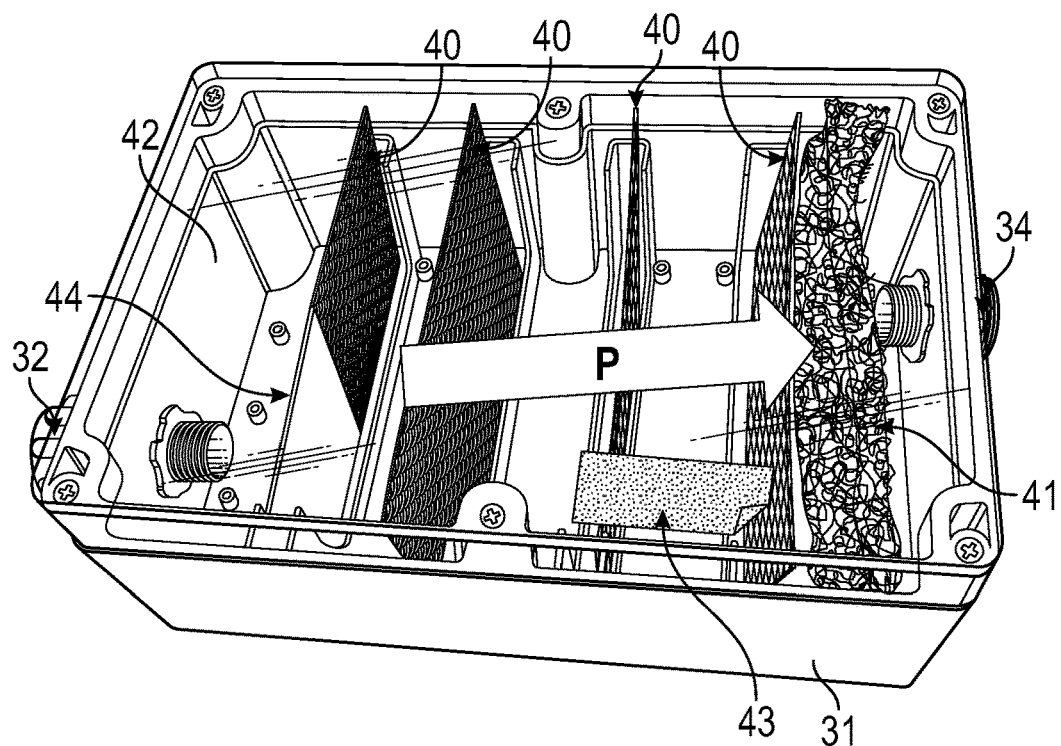
FIG. 3 is a more detailed view of an embodiment of the water heater flushing system including the internal components within the housing.
Figure 4:
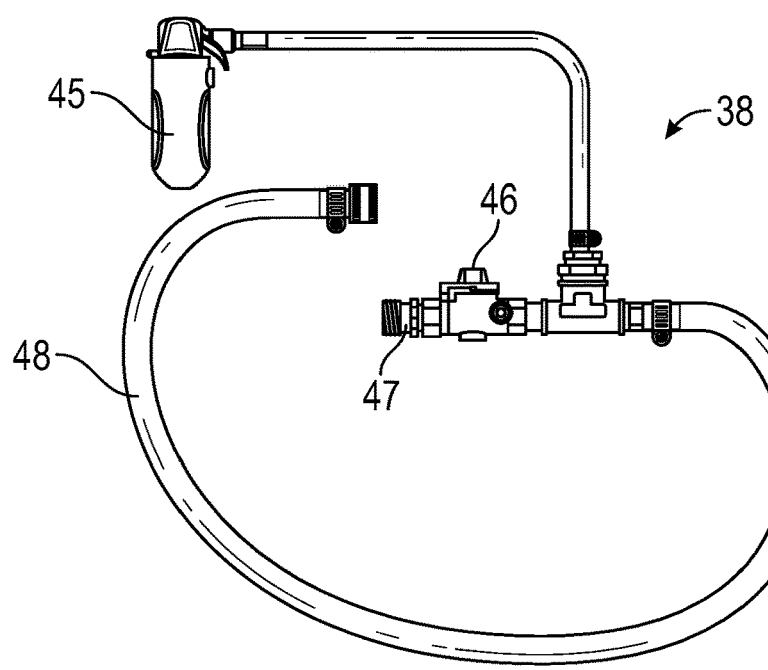
FIG. 4 is a schematic diagram illustrating an embodiment of the sediment buster of the water heater flushing system of FIG. 2.

Referring now to FIGS. 2-4, a water heater flushing system 30 will now be described. As illustrated, a water heater 20 includes a tank 21, with a cold water inlet 22 and associated valve 23, and a hot water outlet 24. A temperature and pressure relief (TPR) valve 25 and associated discharge tube 26 are included, as would be appreciated by those skilled in the plumbing field. Other features include a sacrificial anode 27, dip tube 28 associated with the cold water inlet 22, and a drain port 29. Various other standard features such as heating elements, controllers, and thermostats are not shown for ease of description.

The water flushing system 30 may include various components such as a filter housing 31 (Progressive Filter) having an inlet 32 at a first end and configured to be coupled to the drain port 29 of the water heater 20 (e.g. via an appropriate connection hose) and receive water therefrom, and an outlet 34 at a second end and configured to discharge water from the filter housing 31. The inlet 32 and outlet 34 may be typical hose connectors with external threads or an internally threaded collar. Of course, other connectors may also be used. Also, the inlet 32 and outlet 34 may be reversed, i.e. either end of the housing 31 may be used as the inlet or outlet.

Optionally, a water pump 36 may be coupled to the outlet 34 of the filter housing 31 (e.g. via a connection hose). The water pump 36 may be coupled within the system 30 using a connection hose 37, for example, configured to be coupled to a temperature and pressure relief (TPR) valve 25 (e.g. via the discharge tube 26) of the water heater 20 to recirculate the water back into the water heater tank 21 and define a waterless flushing process. The connection hose 37 may include a quick connection fitting configured for connection to the TPR valve 25 or discharge tube 26. The water pump 36 may also be integrated within the filter housing 31 in other embodiments.

Also optionally, a sediment buster 38 may be coupled to the inlet 32 of the filter housing 31 and configured to send a fluid (e.g. air or water) into the drain port 29 of the water heater 20, as will be described in greater detail below.

Referring now to the more detailed view of the filter housing 31 in FIG. 3, there are a series of filter elements 40 that are positioned and spaced apart within the housing transverse to a water flow path P defined between the inlet 32 and the outlet 34. The series of filter elements 40 are configured to separate solid impurities from the water according to different particle sizes (e.g. progressively different or finer particle sizes) in the water flow path P between the inlet 32 and the outlet 34. The solid impurities may be at least one of sediment and scale as would be appreciated by those skilled in this field.

The filter elements 40 may be removable, for example, so they can be replaced. The filter elements 40 may be mesh screens. The mesh screens may be stainless steel mesh screens. Also, a carbon filter 41 may be positioned in the filter housing 31 between the series of filter elements 40 and the outlet 34. In an embodiment, the series of filter elements 40 includes 4-5 stainless steel interchangeable mesh screens that separate the scale and sediment by size. For example, the size mesh may range from 5 microns (smallest) to ½ inch or vice versa. The carbon filter 41 may reduce smell, color and finer particles.

A viewing feature 42 is carried by the filter housing 31 and is configured to provide visual access to an interior of the filter housing 31 for inspection of separated solid impurities at each of the filter elements 40. The viewing feature 42 may be an openable lid connected to the housing, e.g. via a hinge and latch (not shown). Also, such a lid may be a transparent lid, as illustrated. The filter housing 31 and viewing feature 42 or lid may be watertight for pressures of at least 200 psi, for example. The transparent lid may include a solid impurities identification feature 43 such as a color or size identification chart that would aid the user in identifying and determining the type of minerals present in the water.

A water diverter 44 may be positioned between the inlet 32 and the series of filter elements 40, and is configured to disrupt a direct flow of water to the series of filter elements 40. The water diverter 44 may be a solid portion within a first filter element.

Referring more specifically to FIG. 4, the sediment buster 38 may include a fluid supply device 45, such as a compressed gas cartridge. A shut-off valve 46 is located between the fluid supply device 45 and the connection 47 that leads to the inlet 32 of the filter housing 31 so that the fluid can be directly sent to the drain port 29 of the water heater 20 via hose 48, for example. The fluid supply device 45 may be a fluid pump (e.g. a hand pump) or compressed fluid supply, such as a $CO_2$ cartridge, for example.

All parts may be rated for hot water with temperatures in access of 220 degrees, and all parts may be rated for pressures in access of 200 psi.

Thus, a water heater flushing process begins with the cold water inlet for water heater being turned off. Once the inlet 32 and outlet 34 connections have been made, the TPR valve 25 lever should be opened. Then, the water heater drain port 29 is opened. If the water pump 36 is being used, then it will then draw the contaminated water through the filter housing 31 and series of filter elements 40 while cleaning it and allowing the water to circulate back into the tank 21 via the TPR valve. This allows the "Water Heater Flushing Process" to be waterless.

If there is no water flow from the drain port 29 then such would indicate sediment, scale, etc. buildup and would require a way to break it up. The sediment buster 38 may be optionally used by connecting it between the water heater drain port 29 and inlet side of the filter housing 31. The shut off valve 46 is located between the filter housing 31 inlet 32 and the entrance point for the fluid injection from the fluid supply device 45 to allow fluid flow only in the direction of the water heater 20. Once the fluid has entered the water heater 20 to bust up the sediment, then circulation may be tried again. This process may take a few times to clear enough sediment and allow drainage of the water.

The solid impurities may be analyzed via the viewing feature 42 of the filter housing 31. For example, the solid impurities may include rust flakes from the water pipes, sand grains, small pieces of organic matter, clay particles, or any other small particles in the water supply. White scale may indicate calcium hardness. Black, rust or sand may indicate decaying galvanized pipes or sediment in well water. Blue or gray chips may indicate a decaying dip tube. Black, orange or gray flakes may indicate a decaying anode rod. This information may be useful in determining what type of water filtration and/or purification system may be appropriate for the region. Again, the solid impurities identification feature 43 such as a color or size identification chart would aid the user in identifying and determining these and other types of minerals present in the water.

Once water passing through the housing filter is free from new contaminants than the water heater drain port 29 and the TPR valve can be closed and the water flushing system 30 is removed.

The embodiments described above provide a water heater flushing system that is more environmentally friendly by conserving water and not contaminating the environment, and that allows for the visual inspection and analysis of the sediment and minerals. The embodiments may also provide a water heater flushing system that can more easily break up a clog at the water heater drain.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A water heater flushing system comprising:
   a housing including an inlet at a first end and configured to be coupled to a drain port of the water heater and receive water therefrom, and an outlet at a second end and configured to discharge water from the housing;
   a series of filter elements positioned and spaced apart within the housing transverse to a water flow path defined between the inlet and the outlet, the series of filter elements being configured to separate solid impurities from the water according to different particle sizes in the water flow path between the inlet and the outlet; and
   a viewing feature carried by the housing and configured to provide visual access to an interior of the housing for inspection of separated solid impurities at each of the filter elements, the viewing feature comprises an openable transparent lid connected to the housing and includes a solid impurities identification chart configured to aid the user in identifying and determining types of minerals present in the water based upon the solid impurities separated at each of the filter elements.

2. The water heater flushing system according to claim 1, wherein the solid impurities identification chart comprises at least one of a color and size identification chart.

3. The water heater flushing system according to claim 1, wherein the filter elements comprises mesh screens.

4. The water heater flushing system according to claim 3, wherein the mesh screens comprise stainless steel mesh screens.

5. The water heater flushing system according to claim 1, further comprising a water pump coupled to the outlet of the housing.

6. The water heater flushing system according to claim 5, wherein the water pump includes a connection hose configured to be coupled to a temperature and pressure relief (TPR) valve of the water heater to recirculate the water back into the water heater and define a waterless flushing process.

7. The water heater flushing system according to claim 6, wherein the connection hose incudes a quick connection fitting configured for connection to the TPR valve.

8. The water heater flushing system according to claim 1, further comprising a carbon filter positioned in the housing between the series of filter elements and the outlet.

9. The water heater flushing system according to claim 1, further comprising a sediment buster coupled to the inlet of the housing and configured to send a fluid into the drain port of the water heater.

10. The water heater flushing system according to claim 9, wherein the sediment buster includes a fluid supply device, and shut-off valve between the fluid supply device and the inlet of the housing.

11. The water heater flushing system according to claim 10, wherein the fluid supply device comprises a fluid pump or compressed fluid supply.

12. The water heater flushing system according to claim 1, wherein the solid impurities comprise at least one of sediment and scale.

13. The water heater flushing system according to claim 1, wherein the filter elements are removable.

14. The water heater flushing system according to claim 1, further comprising a water diverter positioned between the inlet and the series of filter elements, and configured to disrupt a direct flow of water to the series of filter elements.

15. The water heater flushing system according to claim 1, wherein the housing and lid are watertight for pressures of at least 200 psi.

16. A water heater flushing system comprising:
a housing including an inlet at a first end and configured to be coupled to a drain port of the water heater and receive water therefrom, and an outlet at a second end and configured to discharge water from the housing;
a series of filter elements positioned and spaced apart within the housing transverse to a water flow path defined between the inlet and the outlet, the series of filter elements being configured to separate solid impurities from the water according to different particle sizes in the water flow path between the inlet and the outlet;
a water pump coupled to the outlet of the housing, the water pump including a connection hose configured to be coupled to a temperature and pressure relief (TPR) valve of the water heater to recirculate the water back into the water heater and define a waterless flushing process; and
a viewing feature carried by the housing and configured to provide visual access to an interior of the housing for inspection of separated solid impurities at each of the filter elements.

17. The water heater flushing system according to claim 16, wherein the connection hose includes a quick connection fitting configured for connection to the TPR valve.

18. A water heater flushing system comprising:
a housing including an inlet at a first end and configured to be coupled to a drain port of the water heater and receive water therefrom, and an outlet at a second end and configured to discharge water from the housing;
a plurality of filter elements positioned in series and spaced apart within the housing transverse to a water flow path defined between the inlet and the outlet, the plurality of filter elements being configured to separate solid impurities from the water according to different particle sizes in the water flow path between the inlet and the outlet; and
a viewing feature carried by the housing and configured to provide visual access to an interior of the housing for inspection of separated solid impurities at each of the filter elements, the viewing feature comprises an openable transparent lid connected to the housing and extending transversely across each of the filter elements and spaces therebetween to aid the user in identifying and determining types of minerals present in the water based upon the solid impurities separated at each of the filter elements to assist in a determination of a type of water filtration and/or purification system that is suitable for use with the water heater.

19. The water heater flushing system according to claim 18, the viewing feature further comprises a solid impurities identification chart configured to aid the user in identifying and determining types of minerals present in the water based upon the solid impurities separated at each of the filter elements.

20. The water heater flushing system according to claim 19, further comprising a water pump coupled to the outlet of the housing; wherein the water pump includes a connection hose configured to be coupled to a temperature and pressure relief (TPR) valve of the water heater to recirculate the water back into the water heater and define a waterless flushing process.

* * * * *